United States Patent
Kim

(10) Patent No.: US 8,896,606 B2
(45) Date of Patent: Nov. 25, 2014

(54) TOUCH SCREEN AND DISPLAY METHOD

(75) Inventor: Hyunwoo Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 416 days.

(21) Appl. No.: 13/067,093

(22) Filed: May 6, 2011

(65) Prior Publication Data

US 2011/0298807 A1 Dec. 8, 2011

(30) Foreign Application Priority Data

Jun. 7, 2010 (KR) .................. 10-2010-0053389

(51) Int. Cl.
| | |
|---|---|
| *G06T 11/20* | (2006.01) |
| *G06T 11/00* | (2006.01) |
| *G09G 5/00* | (2006.01) |
| *G06F 3/0488* | (2013.01) |

(52) U.S. Cl.
CPC .......... *G06T 11/203* (2013.01); *G06F 3/04883* (2013.01)
USPC ............ 345/442; 345/467; 345/468; 345/610

(58) Field of Classification Search
CPC ....................................... G06K 9/48
See application file for complete search history.

(56) References Cited

U.S. PATENT DOCUMENTS

| | | | | |
|---|---|---|---|---|
| 7,190,375 | B2 * | 3/2007 | Dresevic et al. | 345/611 |
| 7,499,055 | B2 * | 3/2009 | Lin et al. | 345/467 |
| 7,697,002 | B2 * | 4/2010 | McCall et al. | 345/467 |
| 2002/0049796 | A1 * | 4/2002 | Dresevic et al. | 707/541 |
| 2002/0163510 | A1 * | 11/2002 | Williams et al. | 345/179 |
| 2003/0235336 | A1 * | 12/2003 | Biswas et al. | 382/195 |
| 2005/0078098 | A1 * | 4/2005 | Dresevic et al. | 345/179 |
| 2005/0088426 | A1 * | 4/2005 | Smirnov et al. | 345/179 |
| 2005/0089237 | A1 * | 4/2005 | Park et al. | 382/242 |
| 2006/0093219 | A1 * | 5/2006 | Gounares et al. | 382/187 |
| 2009/0297030 | A1 * | 12/2009 | Oota | 382/190 |
| 2012/0050293 | A1 * | 3/2012 | Carlhian et al. | 345/442 |

* cited by examiner

*Primary Examiner* — Kee M Tung
*Assistant Examiner* — Zhengxi Liu
(74) *Attorney, Agent, or Firm* — Staas & Halsey LLP

(57) ABSTRACT

A touch screen to smooth a moving trajectory of a touch unit input as a curved line and to display the moving trajectory, and a display method of the touch screen are provided. The display method of the touch screen may include sampling coordinates at touch points when a touch unit moves on a touch screen, determining whether a moving trajectory of the touch unit is a curved line according to inclination between the coordinates, and fitting the sampled coordinates to a curve and displaying the fitted curve on the touch screen upon determining that the moving trajectory of the touch unit is the curved line.

16 Claims, 16 Drawing Sheets

-PRIOR ART-

-PRIOR ART-

TOUCH SCREEN AND DISPLAY METHOD

CROSS-REFERENCE TO RELATED APPLICATIONS

This application claims the priority benefit of Korean Patent Application No. 2010-0053389, filed on Jun. 7, 2010 in the Korean Intellectual Property Office, the disclosure of which is incorporated herein by reference.

BACKGROUND

1. Field

Embodiments relate to a touch screen to smooth a moving trajectory of a touch unit input as a curved line and to display the moving trajectory and a display method of the touch screen.

2. Description of the Related Art

Technology for expressing letters on a touch screen or a touch pad, which is a digital medium, using a touch unit, such as a pen, like writing letters on paper, which is an analog medium, using a pen, has been developed. A digital handwritten letter includes at least one handwritten stroke. When a user moves a touch unit while the touch unit is in contact with a touch screen, a handwritten stroke is created. The handwritten stroke may include (x, y) coordinates corresponding to the end position of the touch unit.

For example, a user may move a touch unit on a touch screen of a computer system to write a letter. At this time, the computer system may sample (x, y) coordinates along a trajectory of the end position of the touch unit and display sampled coordinates. The sampled coordinates indicate points on the created moving trajectory of the touch unit. Sampled data from the touch screen include discrete time-series points.

Conventional methods of interpolating such sampled points include post-processing smoothing and simultaneous line-interpolation.

In the post-processing smoothing, a computer system sequentially stores sampled points in a memory while a user moves a touch unit on a touch screen, connects the points to create straight lines, and displays the straight lines. When the user separates the touch unit from the touch screen, all of the sampled points stored in the system are processed using spline interpolation to create a smooth curve, and the smooth curve is stored in the memory. Subsequently, the screen is cleared, and the created curve is displayed on the screen.

In the simultaneous line-interpolation, a computer system creates sampled coordinates of a touch unit as circles corresponding to pressure in a memory whenever the sampled coordinates and pressure of the touch unit are input while a user moves the touch unit on a touch screen, connects the points to create straight lines, creates quadrangles constituted by tangent lines between an old sampled circle and a new sampled circle in the memory (FIG. 1), and displays the circles and the quadrangles (FIG. 2).

In the post-processing smoothing, however, the sampled points are connected as straight lines while the user moves the touch unit on the touch screen, with the result that strokes connected in smoothed curves, similar to handwriting, are not displayed on the screen. Furthermore, the sampled points are interpolated in a straight line with a fixed width, with the result that the width of the moving trajectory of the touch unit is not smoothly changeable in correspondence to external factors such as pressure. For example, broken lines may occur.

In addition, a trajectory of the touch unit drawn after the user separates the touch unit from the touch screen may be different from the former trajectory of the touch unit. An image displayed on the screen while the touch unit moves on the touch screen is different from an image created after the touch unit is separated from the touch screen, with the result that the user may not accurately be aware of a final trajectory during movement of the touch unit. Also, whenever the moving trajectory is created, the screen is refreshed. Therefore, the user may wait to see if the straight moving trajectory changes into a smooth curve.

In the simultaneous line-interpolation, the sampled circles or points are connected by the tangent lines to constitute the quadrangles, with the result that angled portions 400 and 401 (FIG. 2) may occur. Therefore, the moving trajectory of the touch unit is not created as a fully smooth curve.

In the conventional technology, a user may suffer inconvenience of use (post-processing smoothing) so as to obtain a smooth curved trajectory, or smoothing may be damaged so as to ensure convenience of use (simultaneous line-interpolation).

SUMMARY

According to an aspect of one or more embodiments, there is provided a display method of a touch screen that simultaneously creates a smoothly connected trajectory of a touch unit from sampled points whenever a user moves the touch unit, such as a pen, on a touch screen to implement a digital handwritten stroke like writing letters on paper, which is an analog medium, using a pen, wherein the smoothly connected trajectory of a touch unit has a variable width depending upon external factors, such as pressure or acceleration.

In accordance with an aspect of one or more embodiments, there is provided a display method of a touch screen which includes sampling coordinates at touch points when a touch unit moves on a touch screen, determining whether a moving trajectory of the touch unit is a curved line according to inclination between the coordinates, and fitting the sampled coordinates to a curve and displaying the fitted curve on the touch screen when it is determined that the moving trajectory of the touch unit is the curved line.

In an aspect of one or more embodiments, there is provided a touch screen device including a sensing unit to sense touch, a display unit to display the sensed touch, and a controller to sample the sensed touch positions as coordinates, to determine whether a moving trajectory of a touch unit is a curved line, and to fit the coordinates to a curve and control the fitted coordinates to be displayed on the display unit upon determining that the moving trajectory of the touch unit is the curved line.

According to another aspect of one or more embodiments, there is provided at least one computer readable medium storing computer readable instructions to implement methods of one or more embodiments.

BRIEF DESCRIPTION OF THE DRAWINGS

These and/or other aspects of embodiments will become apparent and more readily appreciated from the following description, taken in conjunction with the accompanying drawings of which.

DETAILED DESCRIPTION

Figure 1:
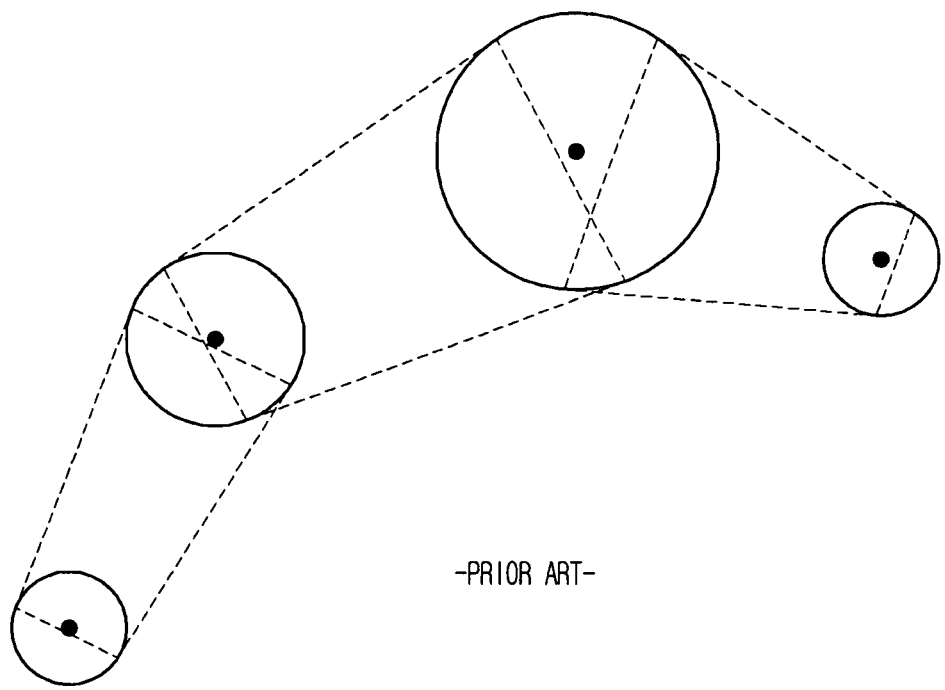
FIG. 1 is a plan view illustrating a conventional process of smoothing a moving trajectory of a touch unit.
Figure 2:
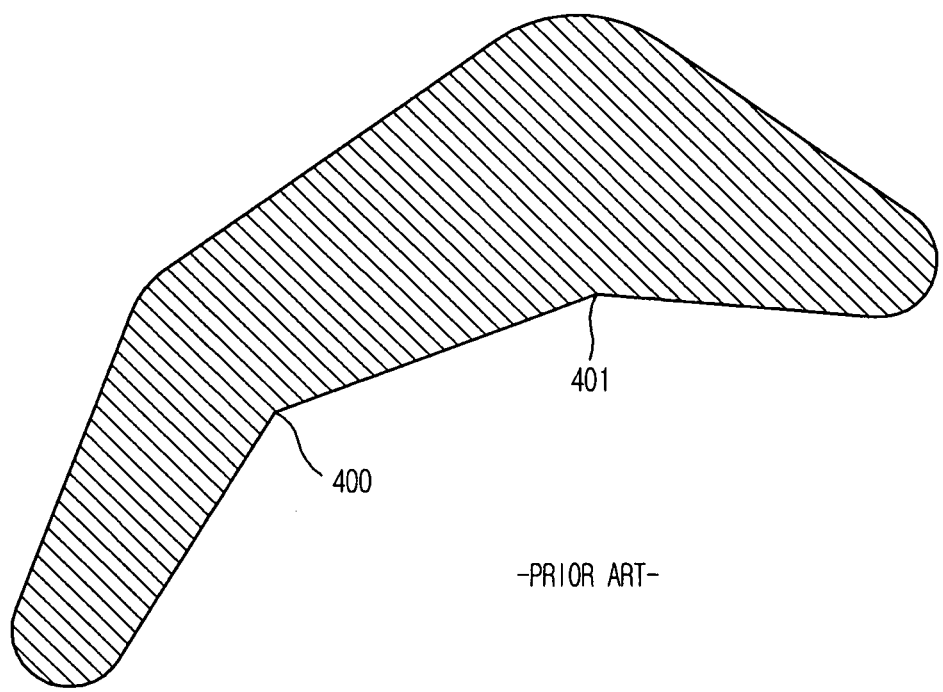
FIG. 2 is a plan view illustrating a moving trajectory of the touch unit smoothed by the conventional process.

Reference will now be made in detail to embodiments, examples of which are illustrated in the accompanying drawings, wherein like reference numerals refer to like elements throughout.

Figure 3:
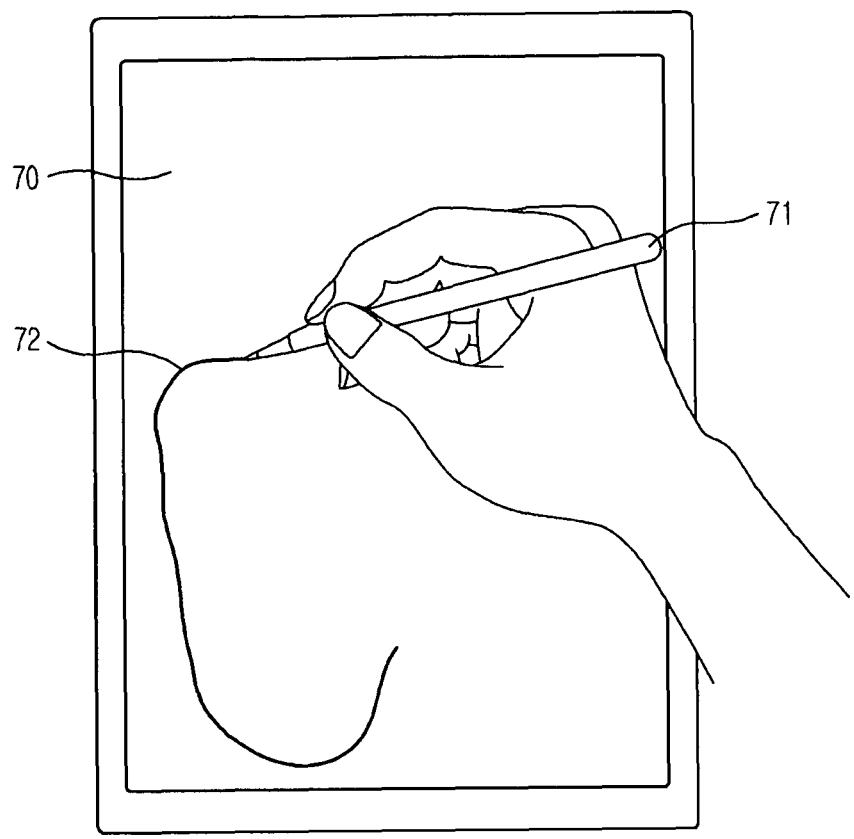
FIG. 3 is a view illustrating a real example of a touch screen device according to an embodiment.

FIG. 3 is a view illustrating a real example of a touch screen device according to an embodiment.

The touch screen device includes a touch screen 70, a touch unit 71, and an image 72 displayed by simultaneously smoothing handwritten strokes having variable widths. The touch screen 70 has a function of sensing touch and a function of displaying a moving trajectory of the sensed touch unit 71. The touch screen 70 includes a general computer system, which includes at least one controller or processor. Display methods are not restricted. For example, an exclusive display unit, such as a monitor, may be used. Also, all touch sensing methods, such as electrostatic type sensing and decompression type sensing, may be used. Examples of the touch unit 71 include but are not limited to fingers, pens, electronic pens, etc.

Figure 4:
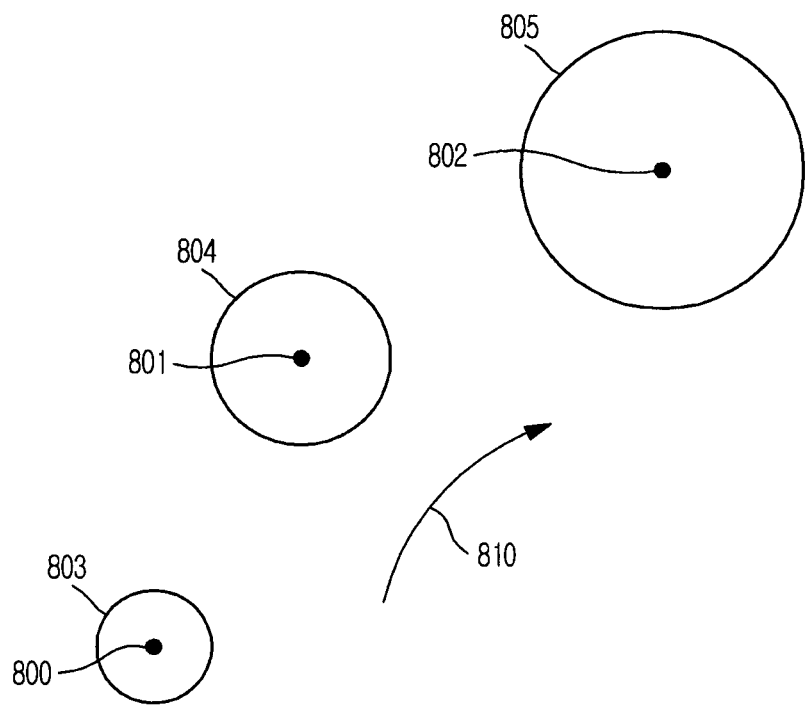
FIG. 4 is a plan view illustrating sampled coordinates of a moving trajectory of a touch unit according to an embodiment.

FIG. 4 is a plan view illustrating sampled coordinates of a moving trajectory of a touch unit according to an embodiment.

FIG. 4 shows forms 803, 804, and 805 of sampled coordinates input the most recently when the touch unit 71 is moved in a direction indicated by an arrow 810. In this embodiment, the forms of the sampled coordinates are shown as circles; however, ellipses or quadrangles may also be used. The form 803 of the sampled coordinates is the third most recent input, the form 804 of the sampled coordinates is the second most recent input, and the form 805 of the sampled coordinates is the most recent input.

Sequentially sampled coordinates are 800, 801, and 802. The sampled coordinates indicate positions of the touch screen 70 touched by the touch unit 7. The diameter of each of the forms (circles) of the sampled coordinates is decided based on information of the touch unit 71, such as acceleration, pressure, and inclination at each input point of time and the form of the touch unit 71. For example, in FIG. 4, the pressure of the touch unit 71 is increased or decreased in the direction indicated by the arrow 810.

Figure 5:
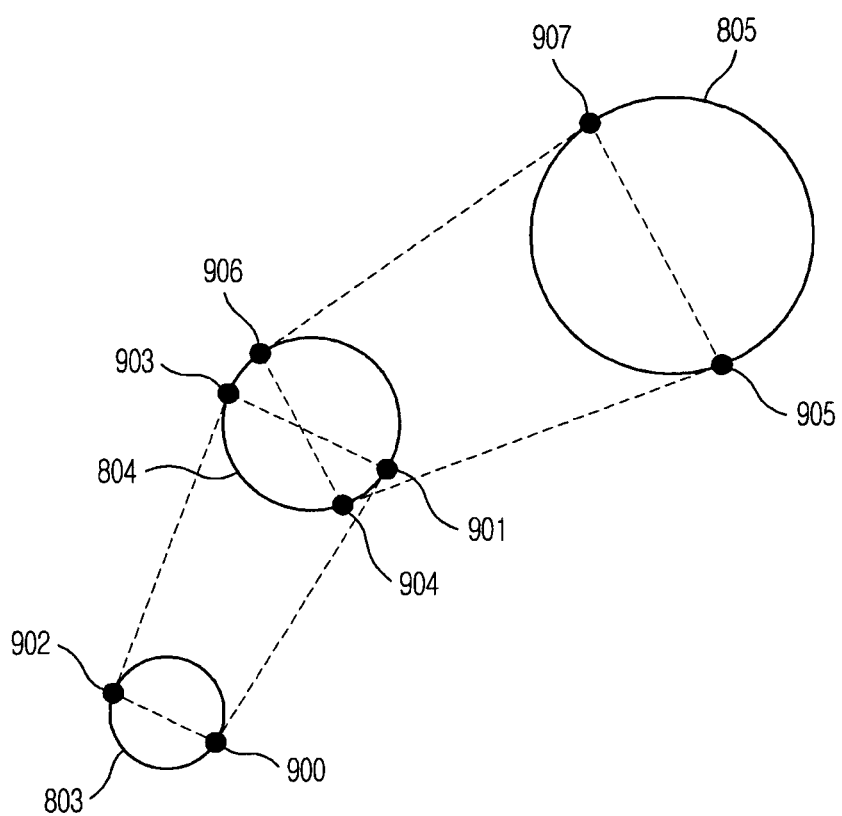
FIG. 5 is a plan view illustrating a process of connecting the sampled coordinates by tangent lines and creating extension points to smooth the moving trajectory.

FIG. 5 is a plan view illustrating a process of connecting the sampled coordinates by tangent lines and creating extension points to smooth the moving trajectory.

Extension points 904, 905, 906, and 907 are contact points at which the forms 804 and 805 of the sampled coordinates, which are the most recently input, are connected by tangent lines. Similarly, extension points 900, 901, 902, and 903 are contact points at which the forms 803 and 804 of the sampled coordinates are connected by tangent lines. Alternatively, the points 900 to 907 may be implemented by centerline figure expansion, which was developed by Texas Instruments in the late 1960's, for computer-aided design (CAD).

Figure 6:
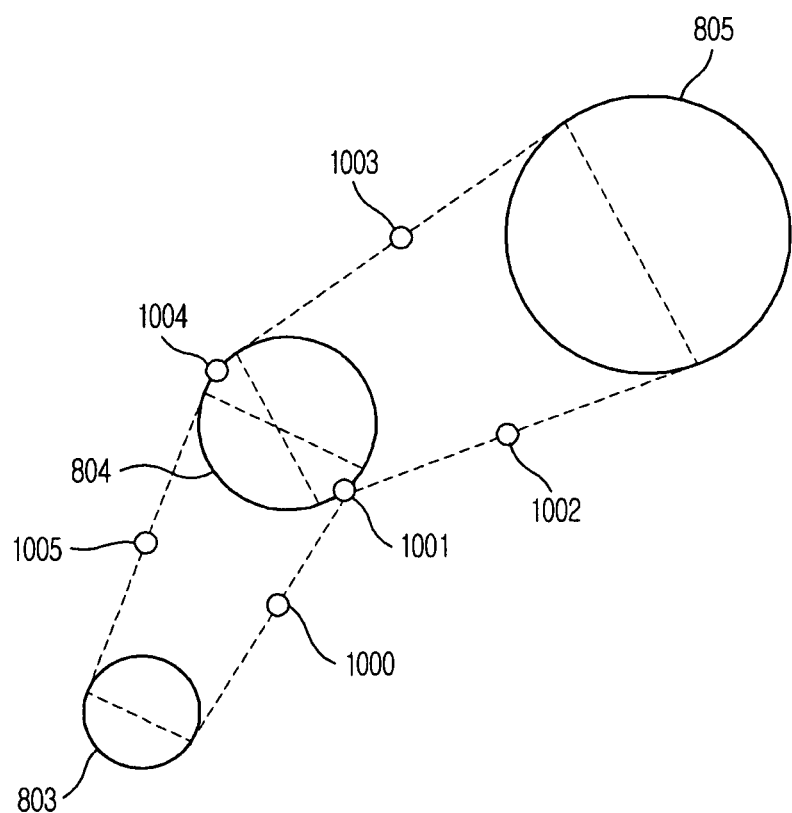
FIG. 6 is a plan view illustrating a process of creating control points using an arithmetic mean to smooth the moving trajectory.

FIG. 6 is a plan view illustrating a process of creating control points using an arithmetic mean to smooth the moving trajectory.

Control points 1000, 1001, 1002, 1003, 1004, and 1005 to create simultaneously smoothed pieces are obtained through arithmetic means of the extension points, i.e., the contact points 900 to 907. That is, the control point 1000 is an arithmetic means of extension points 900 and 901. Similarly, the control point 1001 is an arithmetic means of extension points 901 and 904, the control point 1002 is an arithmetic means of extension points 904 and 905, the control point 1003 is an arithmetic means of extension points 906 and 907, the control point 1004 is an arithmetic means of extension points 903 and 906, and the control point 1005 is an arithmetic means of extension points 902 and 903.

Figure 7:
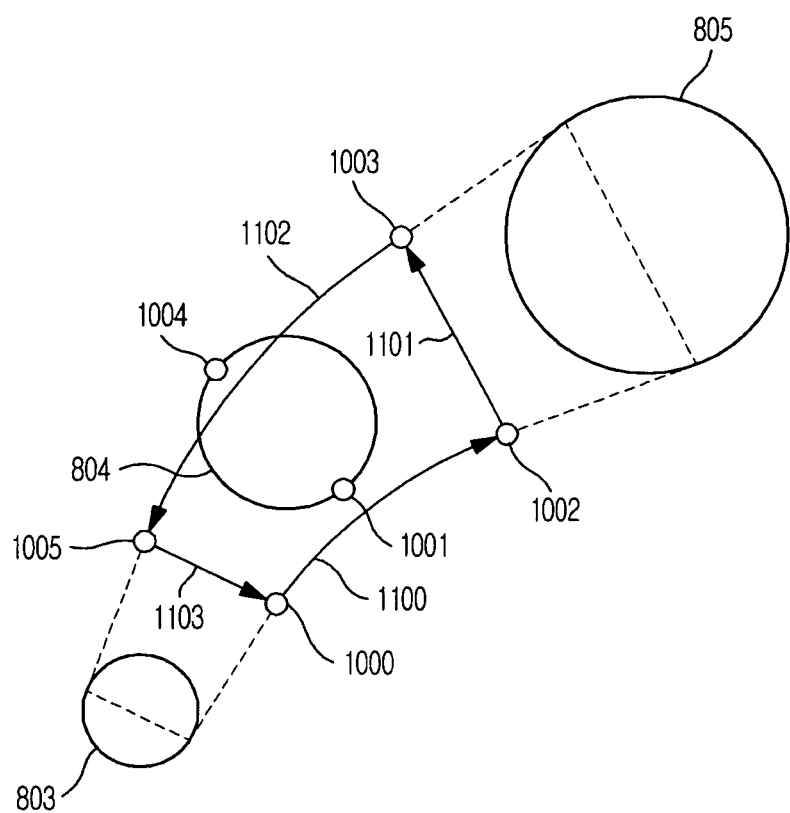
FIG. 7 is a plan view illustrating a process of creating a simultaneously smoothed piece using the control points.

FIG. 7 is a plan view illustrating a process of creating a simultaneously smoothed piece using the control points.

An example of creating simultaneously smoothed pieces is to create a closed path configured by sequentially connecting a curved line 1100, a straight line 1101, a curved line 1102, and a straight line 1103. First, the curved line 1100 is a Quadratic Bezier curve created using the control points 1000, 1001, and 1003. The control point 1000 is a start point, and the control point 1002 is an end point. The straight line 1101 has the control point 1002 as a start point and the control point 1003 as an end point. The curved line 1102 is a Quadratic Bezier curve created using the control points 1003, 1004, and 1005. The control point 1003 is a start point, and the control point 1005 is an end point. The straight line 1103 has the control point 1005 as a start point and the control point 1000 as an end point. As other examples, the points configuring the closed path may be arranged in reverse order, or the closed path may start with a straight line or a curved line different from the curved line 1100.

Figure 8:
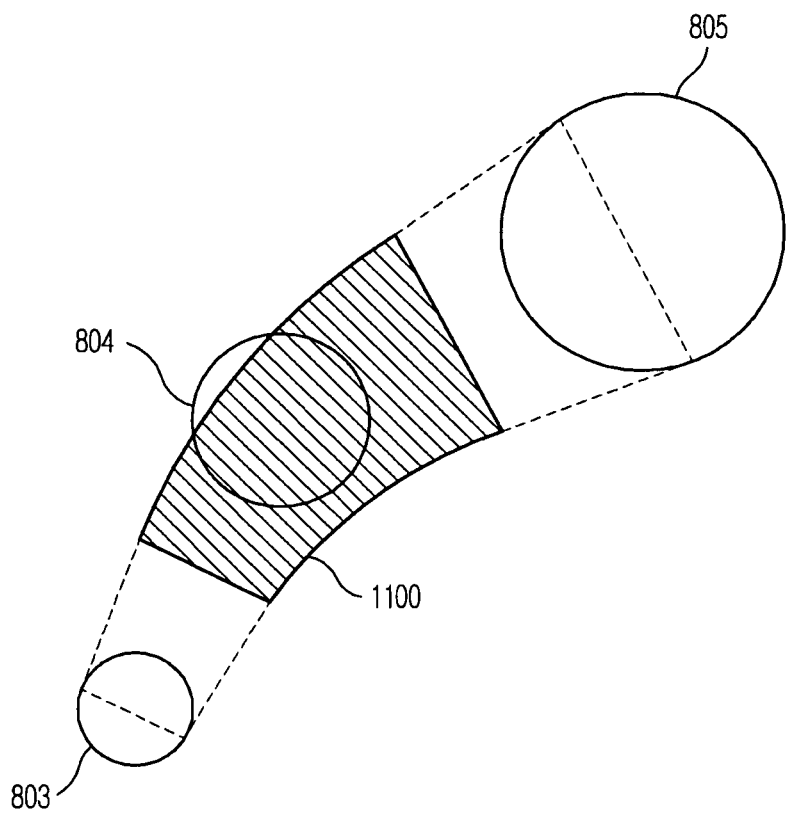
FIG. 8 is a plan view illustrating the simultaneously smoothed piece.

FIG. 8 is a plan view illustrating the simultaneously smoothed piece.

The simultaneously smoothed piece 1200 is created by the process of FIG. 7. A shaded portion is an image displayed on the touch screen 70. Whenever sampled coordinates are input, simultaneously smoothed pieces are created and displayed on the touch screen 70.

Figure 9:
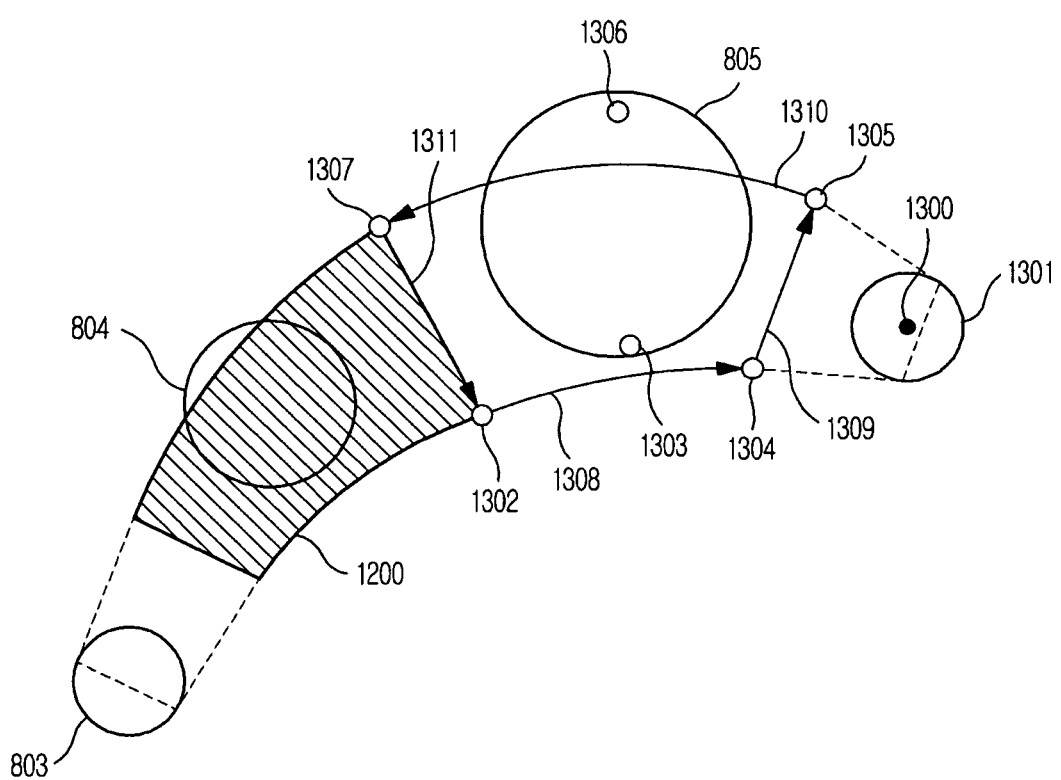
FIG. 9 is a plan view illustrating a new simultaneously smoothed piece created by sampled coordinates at a subsequent sampling cycle.

FIG. 9 is a plan view illustrating a new simultaneously smoothed piece created by sampled coordinates at a subsequent sampling cycle.

The new simultaneously smoothed piece is connected to the simultaneously smoothed piece which has been created and displayed just before creation of the new simultaneously smoothed piece to show a trajectory having a variable width of the touch unit 71 as a continuous smooth curve. When a form 1301 of new sampled coordinates is input, a new simultaneously smoothed piece is created, and the new simultaneously smoothed piece is connected to the old simultaneously smoothed piece 1200. In this example, a sampling position is 1300, and the pressure of the touch unit 71 is decreased or the velocity of the touch unit 71 is increased such that the diameter of the form 1301 of the new sampled coordinates is less than that of the form 805 of the old sampled coordinates. In the same manner as in FIG. 6, control points 1302, 1303, 1304, 1305, 1306, and 1307 are created to create a simultaneously smoothed piece. In the same manner as in FIG. 7, a curved line 1308, a straight line 1309, a curved line 1310, and a straight line 1311 of the new simultaneously smoothed piece are sequentially connected to configure a closed loop. The control points 1302 and 1307 coincide with the control points 1002 and 1003 of the old simultaneously smoothed piece 1200, with the result that the two simultaneously smoothed pieces are connected to each other without discontinuity.

Figure 10:
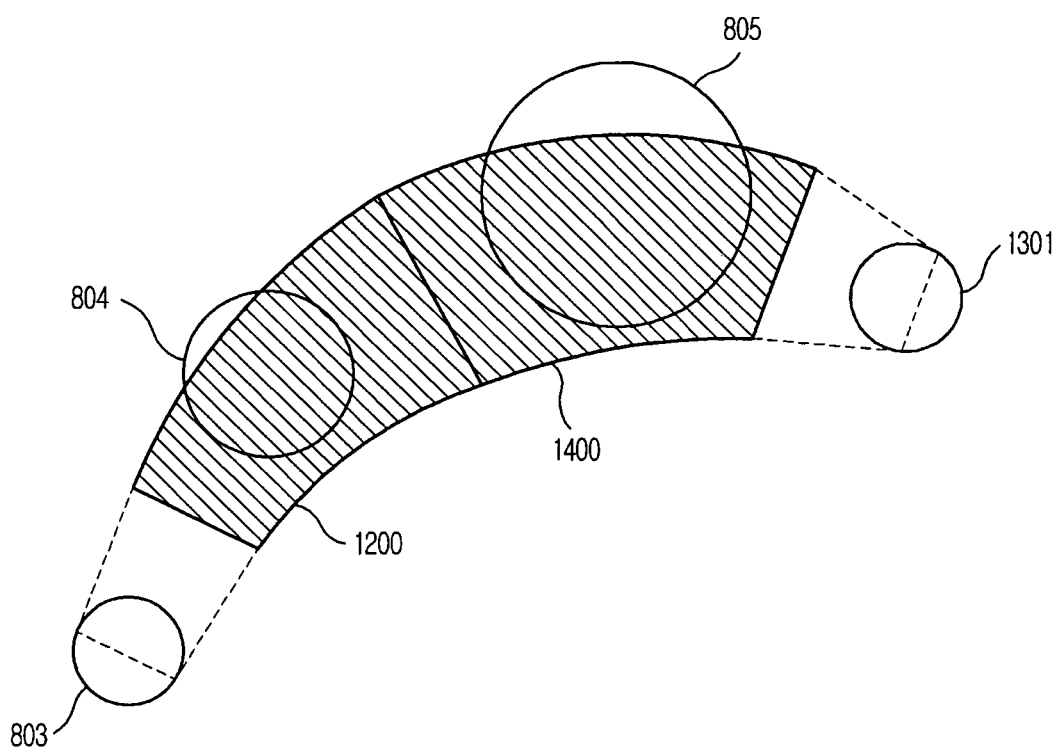
FIG. 10 is a plan view illustrating the new simultaneously smoothed piece connected to the old simultaneously smoothed piece.

FIG. 10 is a plan view illustrating the new simultaneously smoothed piece connected to the old simultaneously smoothed piece.

The new simultaneously smoothed piece 1400 is connected to the old simultaneously smoothed piece 1200. A shaded portion is an image displayed on the touch screen 70.

Figure 11:
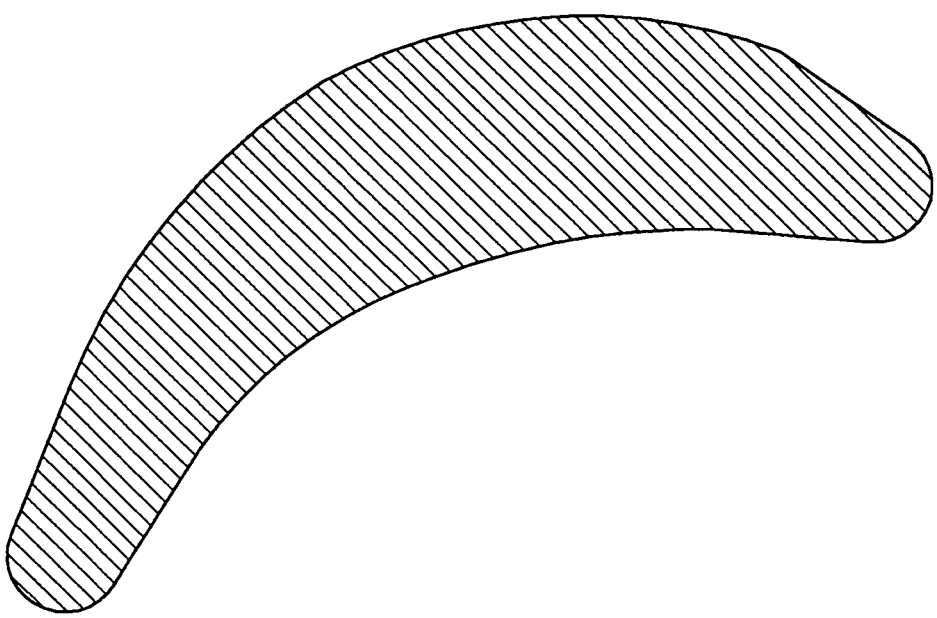
FIG. 11 is a plan view illustrating a display state when movement of the touch unit of FIG. 4 is completed.

FIG. 11 is a plan view illustrating a display state when movement of the touch unit of FIG. 4 is completed.

When a user touches at the form 803 of the sampled coordinates, drags through the forms 804 and 805 of the sampled coordinates, and releases touch at the form 1301 of the sampled coordinates, the image of FIG. 11 is displayed on the touch screen 70.

Hereinafter, the operation of an embodiment will be described with reference to flow charts of the drawings.

Figure 12:
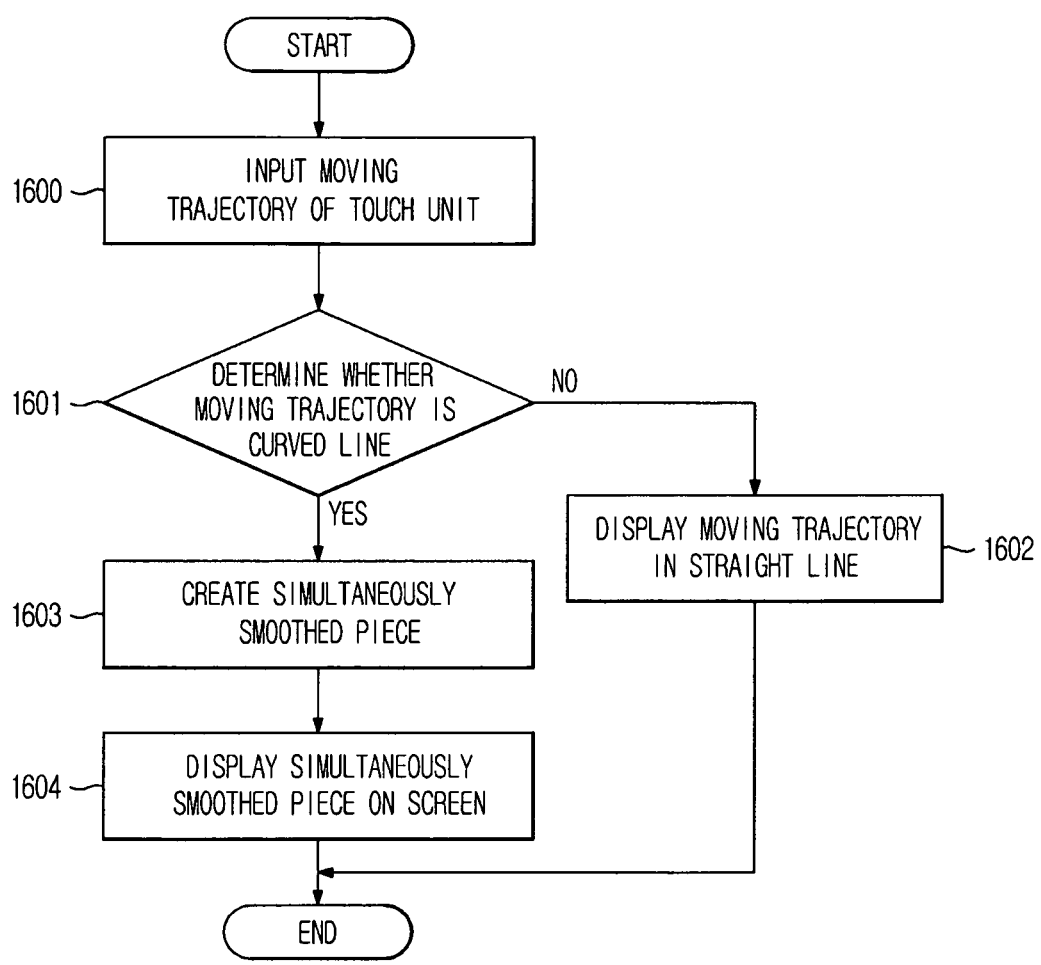
FIG. 12 is a flow chart illustrating a process of smoothing a moving trajectory of a touch unit according to another embodiment.

FIG. 12 is a flow chart illustrating a process of smoothing a moving trajectory of a touch unit according to another embodiment.

When a moving trajectory of the touch unit 71 is input (1600), it is determined whether the moving trajectory is a curved line (1601). When it is determined that the moving trajectory is a straight line, sampled coordinates are connected to display the moving trajectory as the straight line (1602). When it is determined that the moving trajectory is the curved line, sampled coordinates are interpolated to create a simultaneously smoothed piece (1603). Subsequently, the simultaneously smoothed piece is displayed on the screen (1604).

Figure 13:
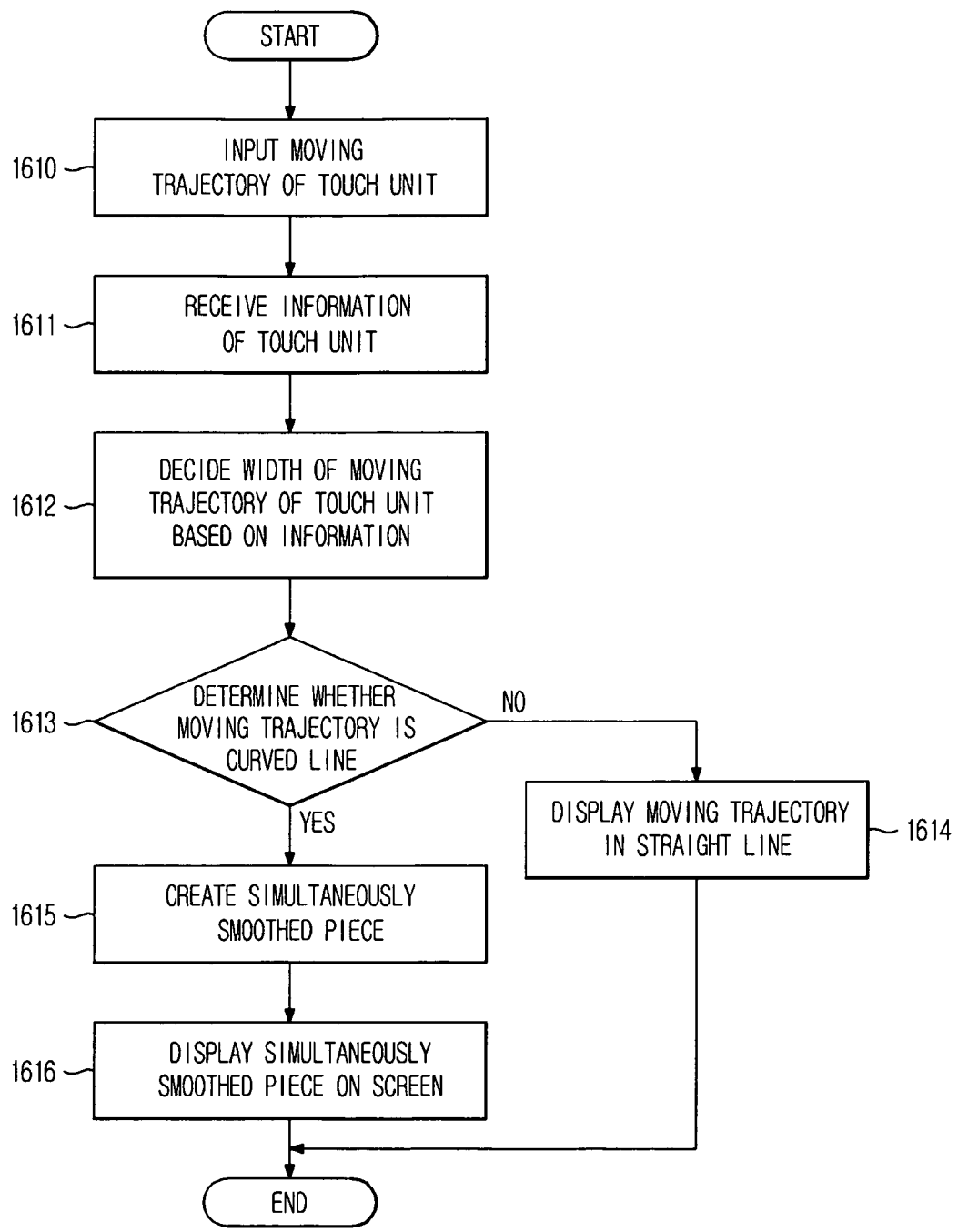
FIG. 13 is a flow chart illustrating a process of smoothing a moving trajectory having a variable width of a touch unit according to another embodiment.

FIG. 13 is a flow chart illustrating a process of smoothing a moving trajectory having a variable width of a touch unit according to another embodiment.

When a moving trajectory of the touch unit 71 has a variable width, a process of FIG. 13 may be performed. A moving trajectory of the touch unit 71 is input (1610), and information of the touch unit 71 is input (1611). A width of the moving trajectory of the touch unit 71 is decided based on the information (1612). Subsequently, it is determined whether the moving trajectory of the touch unit 71 is a curved line (1613). When it is determined that the moving trajectory is a straight line, sampled coordinates are connected in a straight line and displayed (1614). When it is determined that the moving trajectory is the curved line, a simultaneously smoothed piece is created with respect to sampled coordinates (1615). Subsequently, the simultaneously smoothed piece is displayed on the touch screen 70 (1616).

Whenever information of the touch unit 71 is input, simultaneously smoothed pieces each having a variable width are repeatedly created and displayed, with the result that a smoothly fitted curve is displayed on the touch screen.

At Operation 1611 of inputting information of the touch unit 71, information of sampled coordinates generated during touch of the touch screen 70 is input such that a user writes a letter using the touch unit 71. The information of the touch unit 71 may be stored in a memory.

Sampling occurs along a route touched by the user. The sampling subject may be the touch screen 70, the touch unit 71, or a combination of the touch screen 70 and the touch unit 71, to which, however, the sampling subject is not limited. During movement of the touch unit 71, a sampling rate at which corresponding coordinates are sampled per unit time may depend on the sampling subject.

Information of the touch unit 71 may include acceleration, pressure, position, time, inclination, and form of the touch unit 71 during sampling, to which, however, information of the touch unit 71 is not limited.

At Operation 1612 of deciding the width based on the information of the touch unit 71, the width of the touch unit 71 is decided using the information (position, time, pressure, inclination, form, etc.) of the touch unit 71 sampled (stored in the memory) at the previous operation. The decided value may be stored in the memory.

Figure 14:
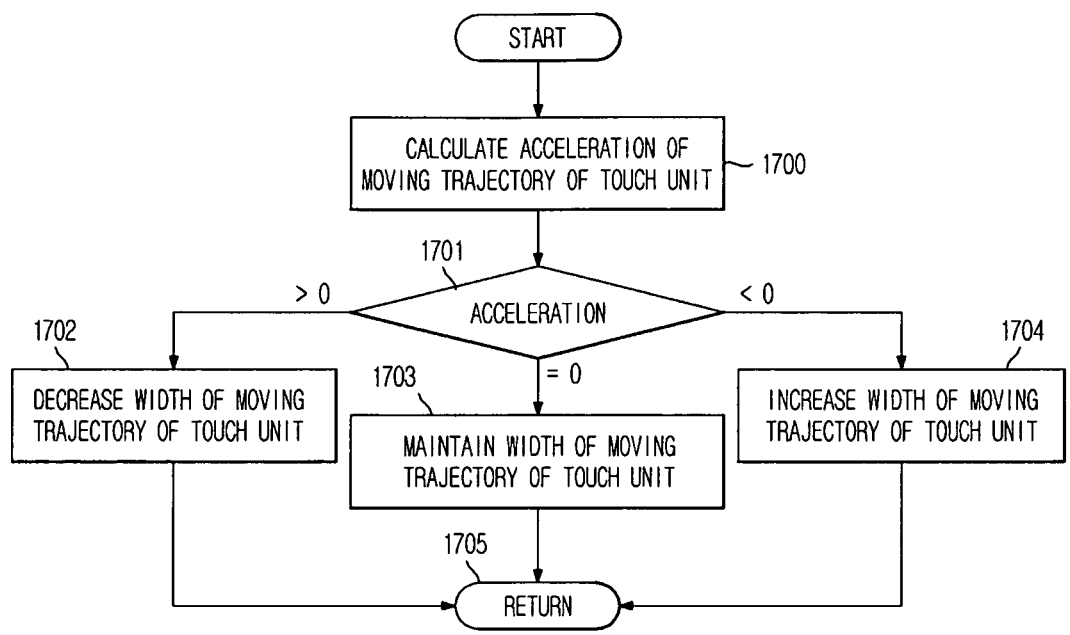
FIG. 14 is a flow chart illustrating a width decision process according to acceleration of the touch unit.

FIG. 14 is a flow chart illustrating a width decision process according to acceleration of the touch unit.

FIG. 14 shows a concrete example of Operation 1612 of FIG. 13, i.e., a process of deciding a moving trajectory according to acceleration. Operation 1612 includes calculating acceleration of the moving trajectory of the touch unit (1700), comparing the acceleration (1701), setting a width of the moving trajectory of the touch unit (1702, 1703, and 1704), and returning the width (1705).

At Operation 1700, velocity change per unit time is calculated from current velocity of the touch unit 71 and next velocity of the touch unit 71. The velocity of the touch unit 71 may be measured by calculating distance change per unit time from position and time of the touch unit 71.

At Operation 1701, the calculated acceleration is compared with 0. The width is decreased when the acceleration is greater than 0 (when writing velocity is increased) (1702), and the width is increased when the acceleration is less than 0 (when writing velocity is decreased) (1704). When the acceleration is equal to 0, the width is maintained (1703), and the last calculated width is returned (1705).

Figure 15:
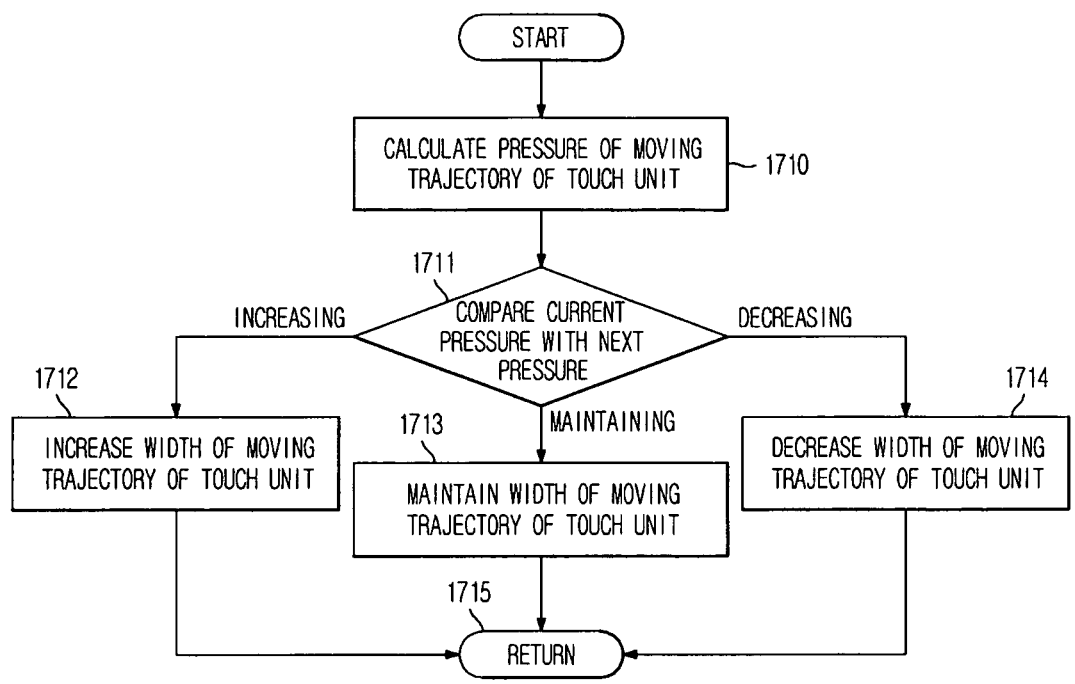
FIG. 15 is a flow chart illustrating a width decision process according to pressure of the touch unit.

FIG. 15 is a flow chart illustrating a width decision process according to pressure of the touch unit.

At Operation 1602 of deciding the width according to information of the touch unit 71, the width may be decided according to pressure in place of acceleration, a combination of acceleration and pressure, a combination of acceleration, pressure, and inclination, or a combination of acceleration, pressure, inclination, and form, to which, however, the width decision method is not limited. In FIG. 15, the width is decided according to the change of pressure.

Operation 1612 of deciding the width includes measuring pressure of the moving trajectory of the touch unit (1710), comparing current pressure with next pressure (1711), setting a width of the moving trajectory of the touch unit (1712, 1713, and 1714), and returning the width (1715).

At Operation 1710, current pressure of the touch unit 71 and next pressure of the touch unit 71 are calculated. The pressure of the touch unit 71 may be measured by a pressure sensor which may be disposed at the touch screen 70.

At Operation 1711, the current pressure is compared with the next pressure. The width is increased when the pressure is increased (1712), and the width is decreased when the pressure is decreased (1714). When the pressure is not changed, the width is maintained (1713), and the last calculated width is returned (1715).

Figure 16:
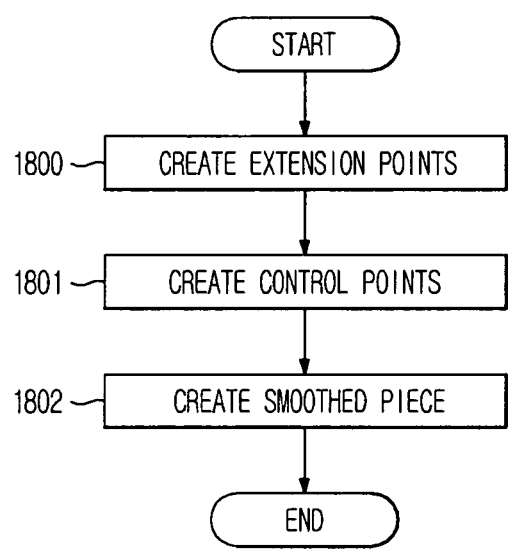
FIG. 16 is a flow chart illustrating a process of creating a simultaneously smoothed piece according to an embodiment.

FIG. 16 is a flow chart illustrating a process of creating a simultaneously smoothed piece according to an embodiment.

Operations 1603 and 1615 of creating a simultaneously smoothed piece include creating extension points (1800), creating control points (1801), and creating a smoothed piece (1802).

At Operation 1800, extension points 900, 901, 902, 903, 904, 905, 906, and 907 are calculated to extend the simultaneously smoothed piece using the width of the trajectory of the touch unit 71 and the tangent lines between the neighboring circles. Creation of the extension points has been described in detailed with reference to FIG. 9.

At Operation 1801, control points 1000, 1001, 1002, 1003, 1004, and 1005 to create the simultaneously smoothed piece are calculated using the extension points 900, 901, 902, 903, 904, 905, 906, and 907 and arithmetic means. Creation of the control points has been described in detailed with reference to FIG. 10.

At Operation 1802, a curved line 1100, a straight line 1101, a curved line 1102, and a straight line 1103 are created using the control points 1000, 1001, 1002, 1003, 1004, and 1005, and are sequentially connected to create a closed loop region. Creation of the smoothed piece has been described in detailed with reference to FIG. 11.

At Operations 1604 and 1616, the created simultaneously smoothed piece 1200 is displayed on the touch screen 70.

As is apparent from the above description, when a user moves a touch unit, such as a pen, on a touch screen, a smooth curve stroke created according to the movement of the touch unit is drawn on the screen. Also, when the user moves the touch unit on the touch screen at a different velocity or pressure, acceleration of a moving trajectory of the touch unit is increased or decreased, thereby creating a smooth curve stroke having a variable width.

One or more embodiments can be implemented by executing computer readable code/instructions in/on a medium/media, e.g., a computer readable medium/media. The medium/media can correspond to any medium/media permitting the storing of the computer readable code/instructions. The medium/media may also include, alone or in combination with the computer readable code/instructions, data files, data structures, and the like. Examples of code/instructions include both machine code, such as produced by a compiler, and files containing higher level code that may be executed by a computing device and the like using an interpreter. In addition, code/instructions may include functional programs and code segments.

The computer readable code/instructions can be recorded in/on a medium/media in a variety of ways, with examples of the medium/media including magnetic storage media (e.g., floppy disks, hard disks, magnetic tapes, etc.), optical media (e.g., CD-ROMs, DVDs, etc.), magneto-optical media (e.g., floptical disks), hardware storage devices (e.g., read only memory media, random access memory media, flash memories, etc.) and distributed storage media, so that the computer readable code/instructions are stored and executed in a distributed fashion. The computer readable code/instructions may be executed by one or more processors. The computer readable code/instructions may also be executed and/or embodied in at least one application specific integrated circuit (ASIC) or Field Programmable Gate Array (FPGA).

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. A display method of a touch screen device, comprising:
   sampling coordinates at touch points when a touch unit moves on a touch screen;
   determining whether a moving trajectory of the touch unit is a curved line according to inclination between the sampled coordinates; and
   creating type-A control points, each of which is created by calculating a middle position between two contact points on a tangent line, wherein the two contact points are contact points by the tangent line of neighboring sampled coordinates upon determining that the moving trajectory of the touch unit is the curved line, and the neighboring sampled coordinates are circles corresponding to pressure;
   creating type-B control points, each of which is created by intersecting two neighboring tangent lines of the sampled coordinates;
   creating a simultaneously smoothed piece to create a closed path configured by straight and curved lines using the type-A control points and the type-B control points, wherein the curve lines pass through the type-A control points and the curve lines are influenced by but do not pass through the type-B control points; and
   displaying the simultaneously smoothed piece connected to the old simultaneously smoothed piece.

2. The display method according to claim 1, wherein determining whether the moving trajectory of the touch unit is the curved line comprises determining that the moving trajectory of the touch unit is the curved line when an inclination of a first straight line interconnecting current coordinates and next coordinates of the sampled coordinates is different from an inclination of a second straight line interconnecting the next coordinates and coordinates after next.

3. The display method according to claim 2, further comprising receiving information of the touch unit.

4. The display method according to claim 3, wherein the information of the touch unit comprises acceleration, pressure, position, inclination, form, and material of the touch unit during each sampling.

5. The display method according to claim 4, further comprising deciding a width of the moving trajectory of the touch unit according to the information of the touch unit.

6. The display method according to claim 5, wherein deciding the width of the moving trajectory of the touch unit comprises calculating acceleration of the moving trajectory, comparing the acceleration, setting a width of the moving trajectory.

7. The display method according to claim 6, wherein calculating the acceleration of the moving trajectory comprises calculating distance change per unit time of the sampled coordinates to decide velocity of the moving trajectory and calculating change per unit time of the decided velocity.

8. The display method according to claim 7, wherein comparing the acceleration comprises comparing the calculated acceleration of the moving trajectory with zero.

9. The display method according to claim 8, wherein setting the width of the moving trajectory comprises decreasing the width of the moving trajectory when the calculated acceleration is greater than zero, increasing the width of the moving trajectory when the calculated acceleration is less than zero, and maintaining the width of the moving trajectory when the acceleration is equal to zero.

10. The display method according to claim 5, wherein setting the width of the moving trajectory comprises increasing the width of the moving trajectory when pressure of the touch unit is increased, decreasing the width of the moving trajectory when pressure of the touch unit is decreased, and maintaining the width of the moving trajectory when pressure of the touch unit is not changed.

11. The display method according to claim 10, wherein displaying the fitted curve on the touch screen comprises displaying coordinates sampled per unit time in the decided width.

12. The display method according to claim 1, wherein creating a simultaneously smoothed piece comprises creating Quadratic Bezier curve using the type-A control points and the type-B control points.

13. The display method according to claim 1, wherein creating a simultaneously smoothed piece comprises creating each of the straight lines by connecting two type-A control points between two neighboring sampled coordinates.

14. The display method according to claim 1, wherein creating a simultaneously smoothed piece comprises connecting straight and curved lines sequentially.

15. At least one non-transitory computer readable medium storing computer readable instructions that control at least one processor to implement the method of claim 1.

16. A touch screen device comprising:
a sensor to sense touch;
a controller
    to sample the sensed touch positions as coordinates,
    to determine whether a moving trajectory of the touch unit is a curved line according to inclination between the sampled coordinates,
    to create type-A control points, each of which is created by calculating a middle position between two contact points on a tangent line, wherein the two contact points are contact points by the tangent line of neighboring sampled coordinates upon determining that the moving trajectory of the touch unit is the curved line, and the neighboring sampled coordinates are circles corresponding to pressure,
    to create type-B control points, each of which is created by intersecting two neighboring tangent lines of the sampled coordinates; and
    to create a simultaneously smoothed piece to create a closed path configured by straight and curved lines using the type-A control points and the type-B control points, wherein the curve lines pass through the type-A control points and the curve lines are influenced by but do not pass through the type-B control points; and
a display unit to display the simultaneously smoothed piece connected to the old simultaneously smoothed piece.

* * * * *